UNITED STATES PATENT OFFICE.

BERTRAND S. SUMMERS, OF PORT HURON, MICHIGAN.

DYE AND PROCESS FOR PREPARING THE SAME.

1,053,676.  Specification of Letters Patent.  Patented Feb. 18, 1913.

No Drawing.  Application filed June 29, 1909.  Serial No. 505,083.

*To all whom it may concern:*

Be it known that I, BERTRAND S. SUMMERS, a citizen of the United States, residing at Port Huron, in the county of St. Clair and State of Michigan, have invented a certain new and useful Dye and a Process for Preparing the Same, of which the following is a specification.

My invention relates to the production of a new and useful dye and the process of preparing the same, such dye being so-called sulfur red dye stuff.

I have discovered that certain yellow and orange dye stuffs, when treated with sodium sulfid, preferably in an alkaline bath, are changed to red dye stuffs, known as sulfur dyes, and act in the same manner as such dyes. For instance, such dyes as direct yellow T and chlorantin orange TRR act in this way. However, in practising my invention I prefer to use a yellow dye stuff, known as curcumin S, this dye being a sodium salt of the so-called azoxy-stilbene-disulfonic acid, having the formula

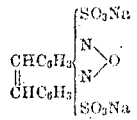

and being obtained by heating p-nitro-toluene-sulfonic acid with concentrated aqueous caustic soda. When this dye which is extremely active chemically is heated with sodium sulfid, preferably in aqueous solution, at a temperature of boiling, or even considerably below, the red dye is formed. Such red dye can be formed, however, in accordance with the process of my invention either by fusing the initial yellow dye with sodium sulfid, or by heating an aqueous solution of the initial dye with sodium sulfid. The chemical reaction which takes place transforms the initial yellow dye to a permanent and fast red dye of the sulfur class, differing entirely from the initial dye used in its production and belonging to a different class. The resultant dye appears in the form of a red p ste, or, when thoroughly dry, in the form of a red powder. The red powder or paste thus formed is easily soluble in water and may be dissolved in hot water and added in the usual manner to the bath in which goods to be dyed are treated. I have found that this effect is considerably enhanced by the presence of from 3 to 5% di-chromate of potash (calculated on the weight of the material to be dyed), which may be added to the dye, or added to the dye bath, as is the usual custom with assistants. While by this addition, some chromic hydroxid is precipitated, no deleterious effect is experienced by its presence in the bath.

In practising my invention, I take 5 to 10% (calculated on the weight of the goods to be dyed) of the yellow or orange dye stuff, above mentioned, and add to the same from 3 to 5% caustic soda, and from 5 to 10% sodium sulfid. The dye is dissolved in hot water in the usual way, and added to the bath. It will be seen from this that the yellow or orange dye can be treated exactly as if it were a red sulfur dye in the beginning, that is, the change being effected in the process of dissolving the dye. In this latter case the red dye is obtained in a solution which may be added directly to the bath. While, therefore, the dye may be reduced from said solution to the form of a red paste, as hereinbefore stated, it will be understood that the dye of my invention is present in the solution itself before being so reduced.

I claim:

1. The process of making a dye stuff which consists in heating a sodium salt of azoxystilbene-di-sulfonic acid with sodium sulfid.

2. The process of making a dye stuff which consists in causing the yellow dye stuff known as curcumin S to chemically combine with sodium sulfid.

BERTRAND S. SUMMERS.

Witnesses:
GEO. T. COPPRENORE,
HARRIET T. SUMMERS.